March 22, 1966     E. A. VERRINDER     3,241,689

ARTICLE HANDLING APPARATUS

Filed Nov. 30, 1962     8 Sheets-Sheet 1

INVENTOR
ERNEST A. VERRINDER

BY *Hans G. Hoffmeister*

ATTORNEY

March 22, 1966 E. A. VERRINDER 3,241,689
ARTICLE HANDLING APPARATUS
Filed Nov. 30, 1962 8 Sheets-Sheet 4

FIG_7

FIG_6

INVENTOR
ERNEST A. VERRINDER
BY
ATTORNEY

United States Patent Office 3,241,689
Patented Mar. 22, 1966

3,241,689
ARTICLE HANDLING APPARATUS
Ernest A. Verrinder, Riverside, Calif., assignor to FMC Corporation, San Jose, Calif., a corporation of Delaware
Filed Nov. 30, 1962, Ser. No. 244,233
13 Claims. (Cl. 214—6)

This application is a continuation-in-part of the application of Ernest A. Verrinder, Serial No. 41,532, filed July 8, 1960, now abandoned.

This invention pertains to article handling apparatus, and more particularly relates to methods and apparatus for positioning articles on a pallet.

Pallet loading machines presently being used are relatively slow due to the fact that many complicated driving and reversing mechanisms are required to carry out the pallet loading operation. Also, due to the amount of mechanism being used, the machines are expensive and require a considerable amount of floor space.

An object of the present invention is to provide an improved palletizing machine that operates faster than machines presently available, is less expensive, and requires less floor space.

Another object is to provide an improved stripper carriage for a pallet loading machine that is self-reversing and whose range of movement varies automatically with the size of the layer of articles being palletized.

Another object is to provide an improved apparatus for assembling the articles of each layer in a predetermined manner and transferring the articles into position on the pallet.

Another object is to provide an efficient drive mechanism for a stripper carriage of a pallet loading machine.

Another object is to provide an improved pallet handling mechanism.

Another object is to provide an improved control system for a palletizing machine.

Other and further objects and advantages of the present invention will become apparent from the following description taken in connection with the accompanying drawings.

Figure 1:
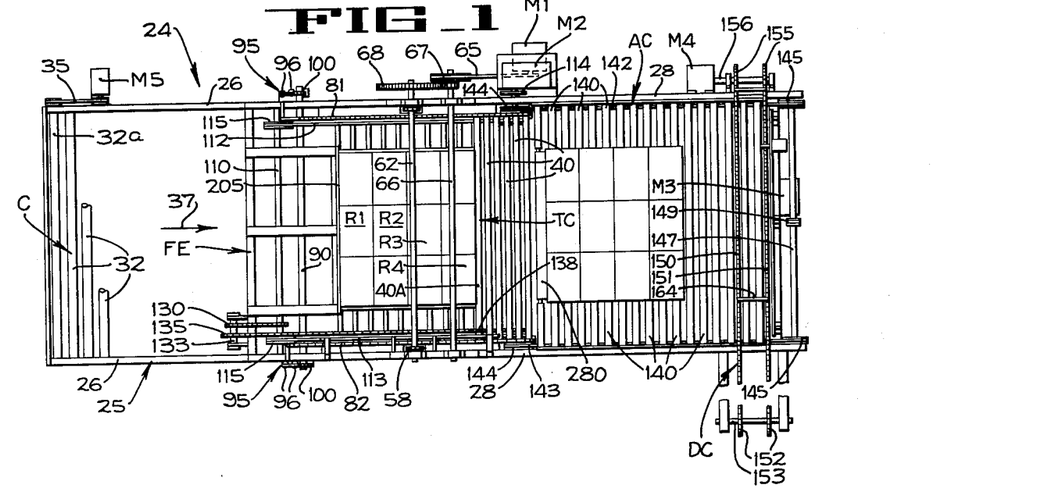
FIGURE 1 is a more or less diagrammatic plan, partly broken away of the machine of the present invention, showing one position of the mechanism during a pallet loading operation.
Figure 2:
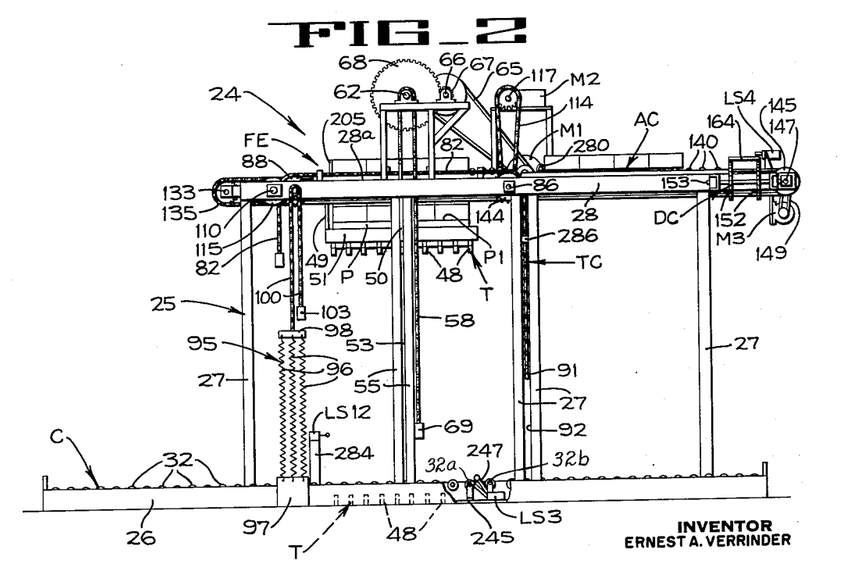
FIGURE 2 is a diagrammatic side elevation of the machine of FIGURE 1.

In the embodiment of the palletizing machine of the present invention illustrated in FIGURES 1 and 2, the machine 24 comprises, in general, a frame support structure 25 having a base 26, a plurality of spaced vertical posts 27, and an upper support frame 28. A pallet feed conveyor C is provided in the base 26 in the form of a plurality of rollers 32 that are interconnected in mutual driving relation by a sprocket and chain drive (not shown) that is operatively connected to the ends of the several rollers. The rollers are driven by a motor M5 (FIG. 1) through a sprocket and chain drive 35 that is connected to the end roller 32a of the conveyor. When an empty pallet P is deposited on the pallet conveyor C, and the motor M5 is energized, the pallet is moved into the machine in the direction indicated by reference arrow 37. The pallet will be advanced to a position above an elevator table T, which at that time will be in a lowered position, indicated in dotted lines in FIG. 2 and in full lines in FIGURE 3, below the surface of the conveying rollers 32. When the pallet P is in position, the table T is moved upwardly until the uppermost surface P1 of the pallet is positioned at approximately the level of the top surface 28a of the upper frame 28. It should be noted that the position chosen for illustration in FIGS. 1 and 2 is the position the table assumes after three layers of articles have been deposited one by one on the pallet, it being understood that the table is lowered a distance equal to the height of one layer of articles after each layer is deposited thereon.

As seen in FIG. 1, a layer of articles consists of several transverse rows R1, R2, R3, and R4. Each layer is deposited on the pallet, or on a layer already on the pallet, by a flexible stripper or transfer carriage TC (FIGS. 2 and 3), in the form of a plurality of interconnected transverse stripper rollers 40. The carriage is mounted for movement from the lowered position of FIGS. 2 and 3 upwardly and to the left to a position directly above the pallet. An accumulator conveyor AC (FIG. 1) receives articles in rows from an article feed conveyor DC, forms the rows into a layer and delivers the layer to a position on the transfer carriage TC when the carriage is in position above the pallet. The carriage then moves to the right (FIG. 2) out from beneath the layer of articles, causing the layer to be deposited on the pallet or on a layer previously deposited on the pallet. The elevator table T includes two side bars 51 between which is set a grid-like support plate having a plurality of transverse bars 48 which are adapted to be disposed between adjacent rollers 32 of the pallet conveyor when the table is in its lowermost position. A rigid and upright post 50 is secured at its lower end to each side bar 51 of the table T. Each post 50 is disposed in a guide slot 53, the slot 53 on one side of the machine being formed by two spaced vertical angle bars 55 that are part of the support structure of the machine, and the slot 53 on the other side being formed by two vertical bars 54 (one only being shown). A lifting chain 58 is secured to the upper end of each table post 50, and each chain is trained around a sprocket 60 that is keyed to a shaft 62 rotatably journalled in the support structure. A reversible motor M1 drives shaft 62 through a belt and pulley drive 65, an idler shaft 66, a gear 67 keyed to shaft 66 and a gear 68 that is in mesh with gear 67 and keyed to shaft 62. A counterweight 69 is secured to the free end of each chain 58.

Figure 6:
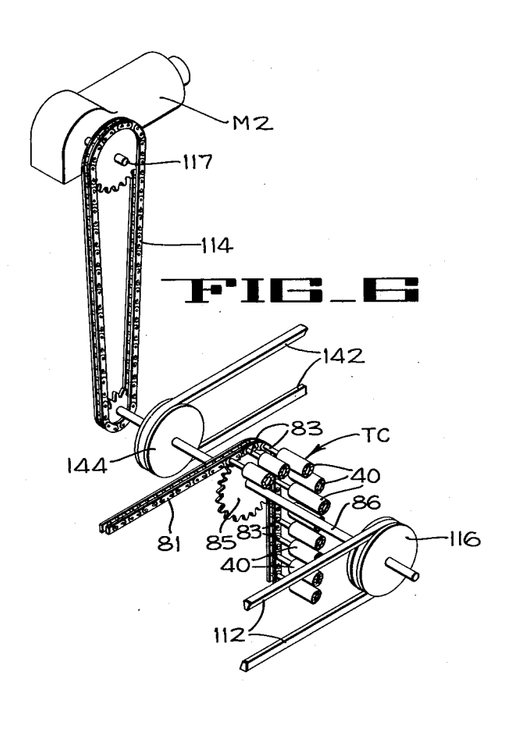
FIGURES 6 and 7 are schematic perspectives of portions of the drive mechanism of the machine of FIGURE 1.

The stripper or transfer carriage TC comprises the several elongated parallel cylindrical rollers 40, each of which is secured at its opposite ends to chains 81 and 82 by means of pins 83 (FIGS. 3 and 4) that are connected to the chain links. The rollers 40 are provided with friction surfaces such as a rubber covering or friction tape so that they will effectively grip the articles. Each of the chains 81 and 82 is trained over a sprocket 85 (FIG.

6) that is freely journalled on a transverse shaft 86 rotatably mounted in suitable bearings in the upper support frame 28. Each chain is also trained around a sprocket 88 (FIG. 4) that is keyed to a forward transverse rotary drive shaft 90. A bar 91 (FIG. 3) is connected between the rearward end of the chains, and each end of the bar is slidably disposed in a slot 92 formed by two of the vertical posts 27 of the support structure 25 of the machine.

Figure 7:
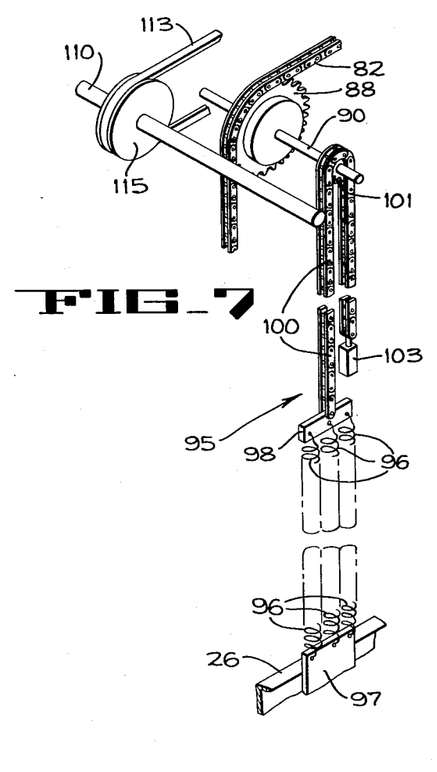

The transfer carriage TC is moved from its rearward position shown in FIGS. 2 and 4, toward the forward end FE of the machine by means of a spring system made up of two tension spring units 95 (FIGS. 1, 2 and 7) that are mounted on opposite sides of the machine. Each unit is made up of a plurality of springs 96 connected at one end to a plate 97 that is fixed to the stationary base 26, and connected at the other end to a bar 98. A chain 100, which is secured to the bar 98, is trained around a sprocket 101 (FIG. 7) that is keyed to the forward drive shaft 90. A counterweight 103 which may be varied, is removably secured to the free end of chain 100.

The spring units 95 (FIG. 2) are designed so that at all times they will apply a force to the stripper carriage TC which will always exceed, by a predetermined small amount, the weight of that part of the stripper carriage TC that has passed over the sprockets 85 on shaft 86. In other words, the spring rate of the spring system is substantially equal to weight per inch of stripper carriage assembly and the system is adjusted so that there is just enough tension to return the carriage to the forward end of the machine.

During movement of the carriage to the forward end of the machine, the undersurface of the rollers 40 are in engagement with two V-belts 112 and 113 (FIG. 4), each of said belts being trained around a pulley 115 keyed to a transverse shaft 110 and around a drive pulley 116 keyed to the shaft 86. The shaft 86 is driven by a reversible motor M2 through a chain and sprocket mechanism 114 that is connected to the motor drive shaft 117. Accordingly, when the motor shaft 117 is rotated, the shaft 86 drives the shaft 110 through the two V-belts 112 and 113. During the palletizing operation, the V-belts are continuously driven in a direction such that their upper runs move toward the right (FIG. 4) i.e., toward the rearward end of the machine. Accordingly, shaft 110 is continuously driven in a clockwise direction, and the rollers 40 of carriage TC are continuously driven in a counterclockwise direction.

Figures 4, 5:
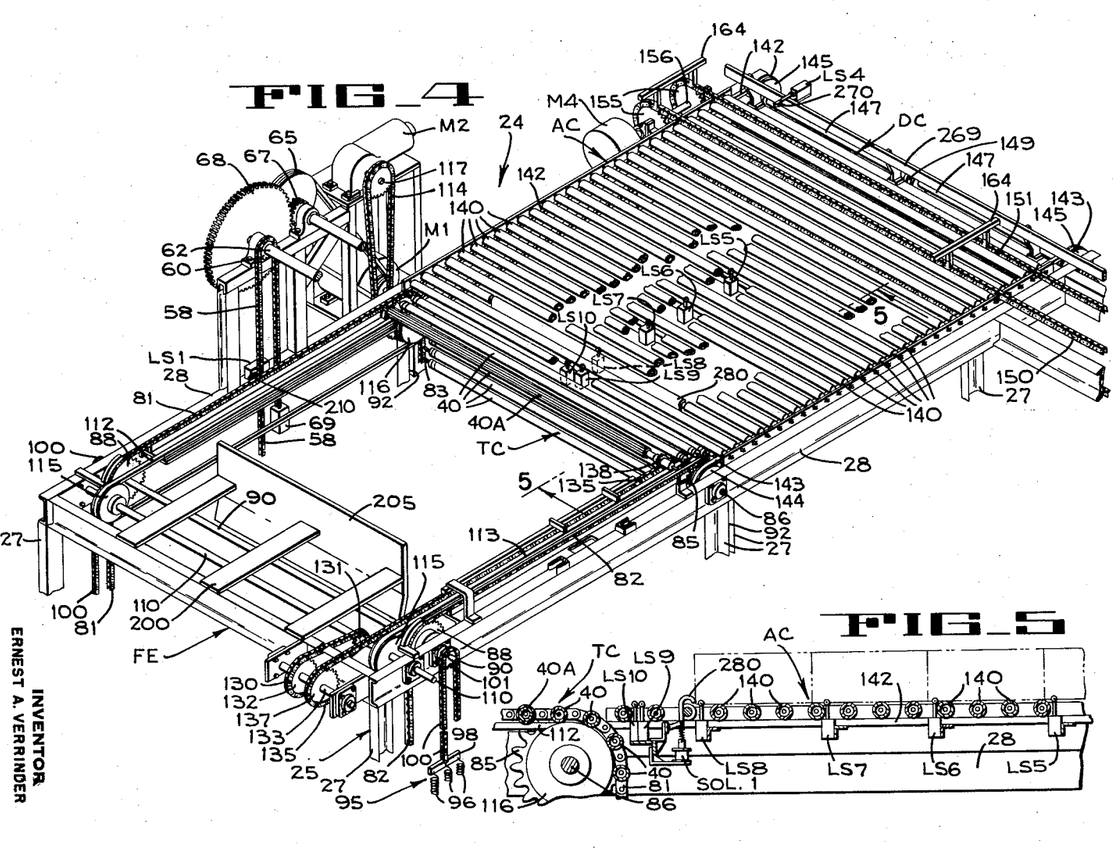
FIGURE 4 is a fragmentary diagrammatic perspective of the upper portion of the machine.
FIGURE 5 is a fragmentary section taken on line 5—5 of FIGURE 4.

While the frictional engagement of the V-belts 112 and 113 with the rollers is sufficient to adequately drive the rollers, it may be desirable under some conditions to positively drive one or more, or all of the rollers 40. In FIGURE 4, a drive arrangement is shown wherein the leading roller 40A is positively driven from shaft 110 through a chain 130 trained around a sprocket 131 keyed to shaft 110 and a sprocket 132 keyed to a shaft 133 that is rotatable in frame 28. A second chain 135, which is trained around a sprocket 137 keyed to shaft 133, is in driving engagement with a sprocket 138 keyed to the roller 40A. Thus, when shaft 110 is rotated clockwise, the upper run of the chain 135 is moved rearwardly to positively drive roller 40A in a counterclockwise direction. Thus, roller 40A is positively rotated in the same direction as the other rollers 40 are frictionally rotated. It will be evident that all rollers could be positively driven, if such an arrangement is desired.

The accumulator conveyor A.C. comprises a plurality of transverse rollers 140 that are rotatably journalled in the upper frame 28 and are rotated by two V-belts 142 and 143 (FIG. 1) which frictionally engage the underside of the rollers. Each belt is trained around a pulley 144 that is freely rotatable on shaft 86 and around a pulley 145 that is keyed on a transverse shaft 147 mounted on the rear end of the machine. A reversible motor M3 (FIGS. 1 and 2) drives the shaft 147 through a belt 149.

The article feed conveyor D.C. comprises a pair of spaced parallel chains 150 and 151 (FIGS. 1 and 4) that extend transversely across the rear end of the machine. Each chain is trained over a sprocket 152 (FIG. 1) journalled on a short shaft 153, and around a sprocket 155 keyed to a shaft 156 that is driven by a reversible motor M4. A plurality of pusher bars 164 are secured to the parallel chains 150 and 151. The upper runs of the chains 150 and 151 are disposed below the surface of the rollers 140 of the accumulator conveyor A.C. while the pusher bars are disposed above the rollers. Accordingly, each pusher bar is adapted to move over the rear end of the accumulator conveyor A.C., from right to left in FIG. 4, to slide a row of articles along the surfaces of the rollers 140. When the pusher bar is stopped and the rollers 140 are actuated, the row of articles will be advanced forwardly on the accumulator.

Figure 3:
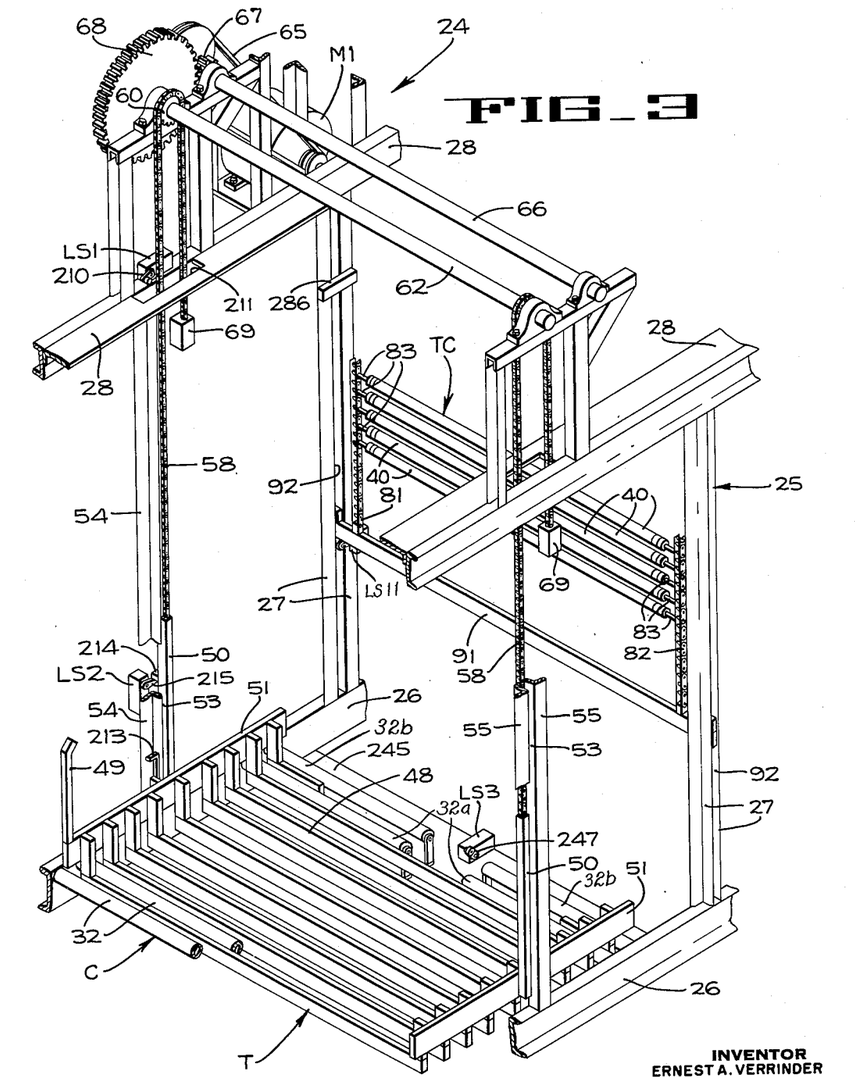
FIGURE 3 is an enlarged fragmentary diagrammatic perspective of a portion of the machine of FIGURE 1.
Figure 8:
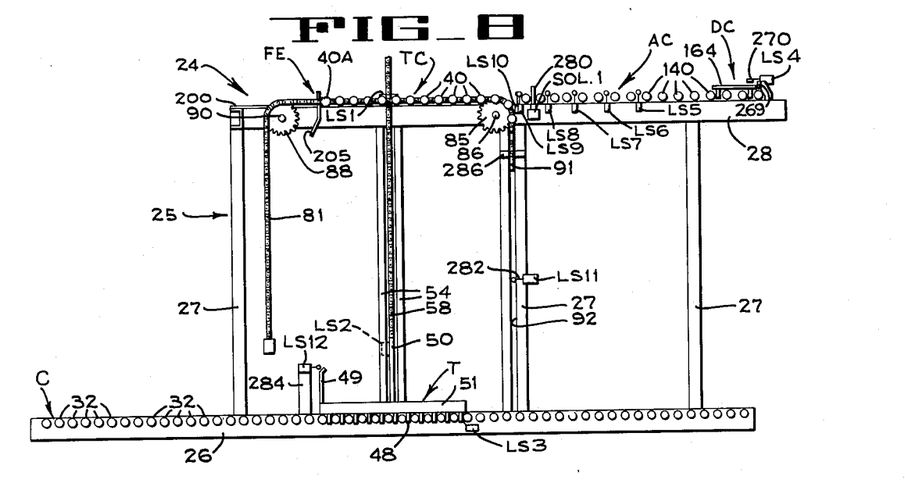
FIGURE 8 is a schematic side elevation of the machine of FIGURE 1, particularly showing the switches used in a pallet loading operation.
Figure 9:
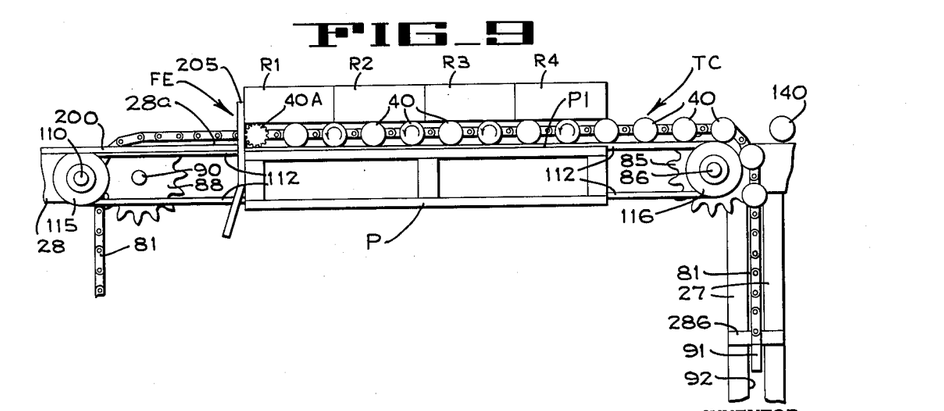
FIGURE 9 is a fragmentary diagrammatic side elevation of a portion of the machine of FIGURE 1, particularly illustrating the action of the transfer carriage as a layer of boxes is dropped onto a pallet.
Figure 10:
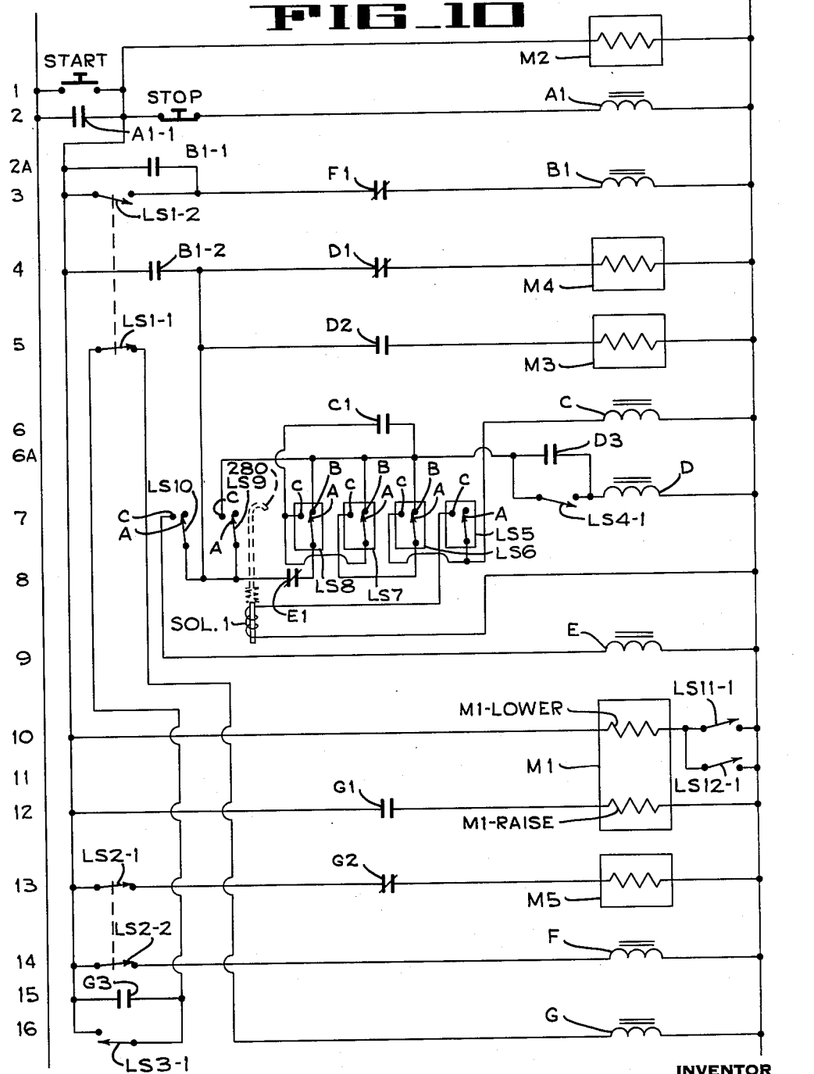
FIGURE 10 is a diagram of an electrical control circuit used during a palletizing operation.

In FIGURES 3, 4 and 8, the switches of the electrical control circuit employed in the machine are pictorially shown while in the circuit of FIGURE 10 they are diagrammatically shown. Switch LS1 (FIG. 3) is mounted on the frame 28 and has a switch arm 210 overlying an opening 211 in the frame. When the table T has been raised to the level at which the pallet on the table T is in the position shown in FIG. 9, ready to receive a layer of articles, an arm 213 (FIG. 3) projecting upwardly from the table engages the switch arm 210 to actuate the switch LS1 to stop the upward movement of the table.

Switch LS2 is mounted on the outer side of the vertical angle bars 54 near the lower portions thereof (FIG. 3) and has a switch arm 215 that is positioned to be contacted by a lug 214 on the upstanding post 50 on that side of the table T during downward movement of the table. When switch LS2 is actuated by the lug 214, the downward movement of the table is stopped.

A switch LS3 is mounted on a cross-bar 245 of the support structure base 26 adjacent the rear of the table T, when the table is in its lowered position. The switch has an inclined arm 247 arranged to be engaged by an empty pallet as it is brought into the machine by the pallet supply conveyor C. When switch arm 247 is so actuated, the motor M5 that drives the conveyor C is de-energized and the coils, that cause the motor M1 to be rotated in a direction to raise table T, are energized.

Figure 12:
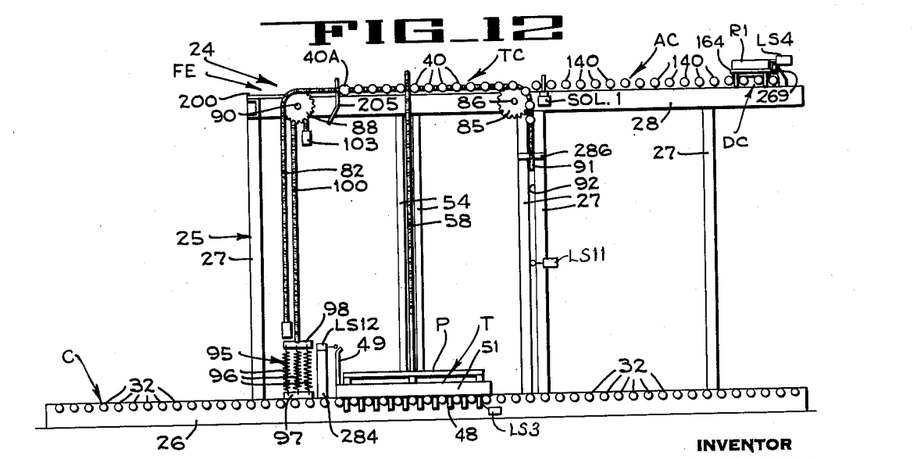

The arm 247 of limit switch LS3 is shown in FIGURES 2 and 3 in its normal position and it will be noted that, in order to accommodate its range of movement, the rollers 32a and 32b of conveyor C between which the arm 247 is located are split to allow it to swing either forward or rearward until the uppermost portion thereof is level with the surface of conveyor rollers 32. However, the switch contacts are arranged to be operated only when the arm 247 has been moved upwardly in a clockwise direction from its normal inclined position of FIG. 2 to a near vertical position or beyond. Thus, when an unloaded pallet is advanced by conveyor C, it will strike arm 247 and move it upwardly to close the switch contacts of LS3 and effect the desired operations. When the pallet moves upwardly away from the switch, the switch arm will automatically return to its normal inclined position. When the loaded pallet descends onto the conveyor C, the switch contacts are not closed as the arm is pressed counterclockwise and downwardly and held in this position until the pallet has moved from the table T. For reliable operation of switch LS3 the bottom portion of each pallet that is aligned with switch LS3 should present a continuous flat surface on which the switch arm 247 may ride while it is being held down. FIGURES 8 and 12 show the position of switch arm 247 when actuated by an unloaded pallet, while the position of the arm when actuated by a loaded pallet is shown by phantom lines in FIGURE 2.

A switch LS4 (FIG. 4) that is mounted on a guide bar 269 and has an actuator arm 270 extending into the path of movement of articles being moved into the machine by a pusher 164 of the article feed conveyor D.C. The switch LS4 is so located that, when the leading article of a row of articles being advanced into the machine engages the actuator arm 270, the row of articles is fully positioned on the rollers of the accumulator conveyor A.C. and are ready to be moved laterally toward the forward end of the machine. Accordingly, engagement of switch LS4 by the leading article of the incoming row will actuate the switch LS4 to stop motor M4 to stop the article feed conveyor D.C.

A series of switches LS5–LS8 are disposed between rollers 140 of the accumulator conveyor AC so that their actuating arms are in position to be engaged by articles being advanced forwardly toward a rectractible stop bar 280 (FIG. 5) that is adapted to project above the surface of the accumulator conveyor to temporarily arrest the rows of articles as they are advanced forwardly to form a complete layer consisting of several rows of articles. As seen in FIG. 5, the switches LS5–LS8 are spaced apart so that each switch is associated with only one row of articles. When four switches LS5–LS8 are used, the layer will be made up of four rows. If layers having more or less rows are desired, the number of switches may be varied. The function of the switches LS5–LS8 is to coordinate the movements of the article feed conveyor DC and the accumulator conveyor AC so that the feed conveyor will be stopped while the accumulator conveyor is advancing a row of articles to a predetermined desired position, and so that the accumulator conveyor will be stopped while the feed conveyor is advancing a row of articles into position on the rollers of the accumulator conveyor.

A pair of switches LS9 and LS10 are mounted on the forward side of the stop plate 280 and these switches are provided with actuators projecting into the path of articles being advanced on the accumulator conveyer AC.

A switch LS11 (FIG. 8) is adjustably mounted on one of the vertical posts 27 of the support structure 25 which defines slot 92. This switch has an actuator 282 arranged to be engaged by the bar 91 on the rear end of the transfer carriage TC. As will be explained presently, when all of the rollers of the carriage have moved out from under a layer of articles and have deposited the articles on the pallet or on the layer of articles next below, the elevator table T must be lowered. Accordingly, switch LS11 is so adjusted in position that, as soon as the layer has been deposited, the bar 91 of the carriage actuates switch LS11 and starts the downward movement of the elevator table T. Thus, switch LS11 is positioned in accordance with the length of each layer of articles.

A switch LS12 is adjustably mounted on a short vertical post 284 in position to be actuated by the cam bar 49 mounted on the elevator. The position of switch LS12 is so adjusted that, when the desired number of layers of articles have been deposited on the pallet, the elevator table T will be lowered and the cam bar 49 will actuate the switch LS12 and keep the elevator-lowering motor energized until the table has reached its lowermost position straddling the rollers of the pallet conveyor C and engaging the switch LS2. Thus, switch LS12 is positioned in accordance with the height of the pallet load.

In FIG. 9, the manner in which the transfer carriage TC walks out from beneath a layer of articles, such as cases, and deposits the layer of cases on the pallet is illustrated. During this palletizing operation the drive shaft of the motor M2 (FIG. 4) is continuously rotated to move the V-belts and the shaft 110 in predetermined directions so that all rollers 40 and 40A are continuously rotated counterclockwise (FIG. 9). When the transfer carriage is at its forward position (FIG. 9) and the rollers are rotating counterclockwise, a layer of cases that has been assembled on the accumulator conveyor, is advanced onto the rollers. It is to be noted that the cases must be moved onto the stripper carriage at a speed that is not less than the surface speed of the stripper rollers 40. The cases are advanced over and by the rollers 40 until the leading row R1 is in abutment with a transverse stop plate 205 which is mounted in fixed position on the support structure 25. When the forward movement of the entire layer is stopped by the plate 205, the under surface of the cases forms a stationary pressure-applying surface with which the rotating rollers are in contact. As soon as this stationary surface is formed, the rollers are confined between this surface and the V-belts. The rollers continue to rotate counterclockwise and, due to their frictional engagement with the undersurfaces of the cases, they are caused to move rearwardly, to the right in FIG. 9; that is, the stripper carriage is caused to walk out from under the cases. It is to be noted that the carriage moves rearwardly against the aforementioned slight resistance of the spring units 95. Accordingly, the tension of the spring system must be adjusted so that it can pull the carriage to the forward end of the machine but will not present excessive resistance to the rearward movement of the rollers from under the articles to be palletized.

Each row R1, R2, R3, and R4 is dropped in turn. When row R4 is dropped, a control which will be explained presently, is actuated to cause the table T to be lowered. As soon as the upper ends of the cases are lowered below the path of movement of the rollers, the spring units 95 pull the carriage to the forward end of the machine. It will be evident that, while one layer of cases is being dropped onto the pallet, another layer can be formed on the accumulator conveyor and that considerable saving in time thereby results. As soon as the transfer carriage reaches its forwardmost position, or a short time before it reaches that position, the second layer of cases is advanced onto the transfer carriage for movement toward the stop plate 205.

Figure 11:
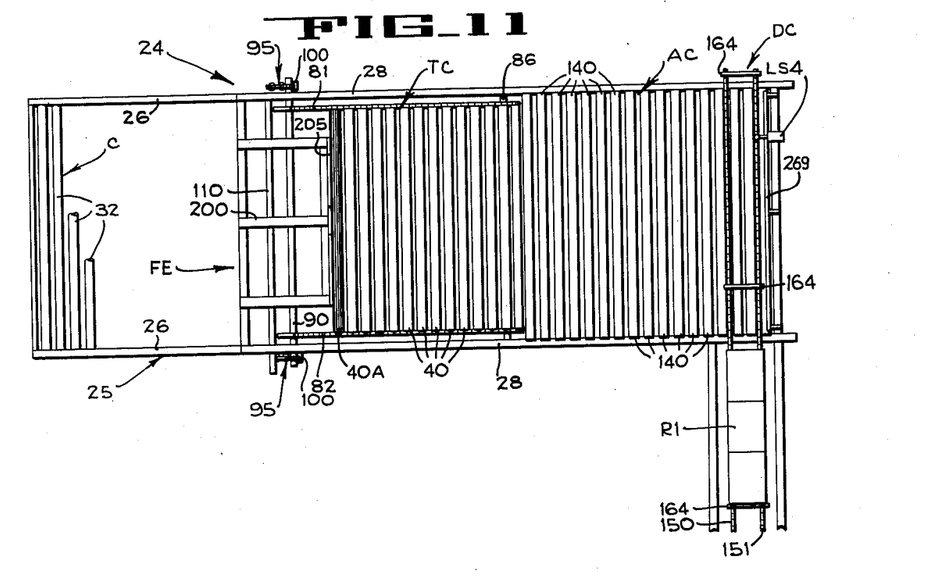
FIGURES 11–18 are diagrammatic views showing the positions of the operating members of the machine during various stages of a palletizing operation.

A complete palletizing operation will be explained in connection with the electrical control diagram of FIG. 10 and the operational views of FIGS. 11–18. It will be assumed that, at the beginning of the cycle, the elevator table T is in its lowermost position, the transfer carriage TC is in its forward position as shown in FIGURES 11–12 with the bar 91 in contact with an abutment strap 286 mounted between an adjacent pair of the vertical posts 27 that define slot 92, and a row R1 of articles, such as cases, is on the feed conveyor D.C. which is at rest.

When the operator pushes the start switch in circuit 1, a relay A1 in circuit 2 is energized and held energized by contacts A1–1 in circuit 2. The motor M2 (circuit 1) is thus energized to drive the V-belts 112 and 113 and the shaft 110 in a direction adapted to rotate the rollers 40A and 40 of the carriage TC in a counterclockwise direction (FIG. 9). The closing of the contacts A1–1 also energizes the pallet conveyor motor M5 in circuit 13 so that when an empty pallet is placed on the conveyor C, it will be moved into the machine.

An empty pallet moving into the machine on the pallet conveyor C actuates switch LS3 to close contact LS3–1 in circuit 16, energizing relay G and closing contact G1 in circuit 12, opening contact G2 in circuit 13 to de-energize the pallet conveyor motor M5, and closing contact G3 in circuit 15 to establish a holding circuit for relay G. The closing of contact G1 energizes the elevator raise coils M1–RAISE in circuit 12. Contact LS2–1 in circuit 13 and contact LS2–2 in circuit 14 are being held closed by the elevator table in its lowered position and, as the table starts up, both LS2–1 and LS2–2 open. The elevator continues toward the top with the empty pallet. When the elevator reaches loading position, the arm 213 on table T engages and actuates switch LS1 to open contact LS1–1 in circuit 5 to de-energize relay G. Contact G2 in circuit 13 closes and contact G1 in circuit 12 opens. The pallet conveyor motor M5 remains inactive because contact LS2–1 is open. At the same time that it opens LS1-1, the elevator closes LS1-2 in circuit 3 to energize relay B1. Contact B1-1 in circuit 2A closes to form a holding circuit for relay B1 and contact B1-2 in circuit 4 closes to enable the stop switches LS5-LS8 that are positioned along the live roll accumulator conveyor AC. Contact D1 in circuit 4 is normally closed.

The article feed conveyor motor M4 in circuit 4 starts when contact B1-2 of relay B1 is closed. A pusher plate 164 on the feed conveyor brings the row R1 of articles, such as cases, into the machine and positions them on the rollers 140 of the accumulator conveyor AC. The boxes actuate switch LS4 to close contact LS4-1 in circuit 7 to energize relay D through LS-8 and also through contacts B1-2, opening contact D1 in circuit 4 and closing contact D2 in circuit 5. The closing of contact D2 energizes motor M3 and starts the accumulator conveyor to move the boxes across the live rolls toward the stop plate 280.

As the row of boxes moves across the live rolls toward the stop plate, they ride successively over switches LS5, LS6, LS7 and LS8 and actuate LS8 to open switch contacts A-B and close contacts A-C. When the relay D was energized to close contact D2 in circuit 5 and open contact D1 in circuit 4, D3 in circuit 6A was closed to form a holding circuit for relay D. As the boxes were moved away from switch LS4, the contact LS4-1 in circuit 7 opens but relay D remains energized through contact D3 and contacts A-B of LS8. As the row of boxes actuate switch LS8, there is a momentary opening of the circuit and relay D is de-energized. The de-energizing of relay D opens contact D3 in circuit 6A, and contact D2 in circuit 5 and closes contact D1 in circuit 4 to energize the feed conveyor motor M4 again. The opening of contact D2 stops the live roll conveyor motor M3. The first row of boxes is then resting against the stop plate 280 on the accumulator conveyor.

Figure 13:
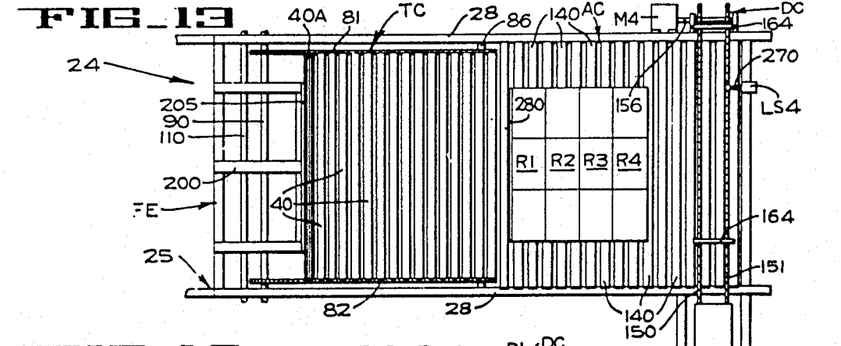
Figure 14:
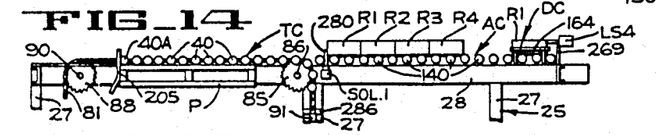

A second row of boxes entering the feed conveyor DC actuates switch LS4 to close contact LS4-1 in circuit 7 to energize relay D through LS8, LS7 and through contacts B1-2, opening contact D1 in circuit 4, closing D2 in circuit 5, and closing D3 in circuit 6A. The boxes move across the live roll section and ride over switches LS5 and LS6 and actuate switch LS7 to open switch contacts A-B and close contacts A-C thereof and to momentarily break the circuit to relay D, to cause the closing of contact D1 and the opening of contacts D3 and D2. The opening of contact D2 stops the live roll conveyor motor M3 and the closing of contact D1 starts the diverter conveyor again. A third row of boxes moves along the diverter conveyor until switch LS4 is actuated whereupon relay D is energized through B1-2, LS8, LS7 and LS6. The row then moves across the live roll section, over LS5 and actuates switch LS6 to open contacts A-B and close contacts A-C thereof. The momentary opening of the circuit de-energizes relay D, starting the diverter and stopping the live rolls. When contacts A-C of switch LS6 are closed, relay D is de-energized and a circuit to a relay C is completed through LS6, LS7 and LS8 to energize relay C and closes contact C1 in circuit 6. A fourth row of boxes then moves along the diverter conveyor and actuates switch LS4 to energize relay D through contact C1. Contact D1 opens and contacts D2 and D3 close. The diverter conveyor stops and the accumulator conveyor starts, and the fourth row R4 is moved to position on the accumulator conveyor to form a complete layer as seen in FIGS. 13 and 14.

The last row of boxes moving along the accumulator conveyor actuates switch LS5 to close contacts A-C thereof and energizes the stop solenoid SOL.1, provided that the stripper carriage is correctly positioned to receive the articles and, therefore, switch LS13 is actuated to close contacts LS13-1. The solenoid moves the stop plate 280 down out of the path of the completed layer of boxes. The accumulator conveyor motor M3 will continue to be driven because of contact C1 which keeps relay D energized. Contact C1 remains closed until the last row of boxes is clear of the switch LS8. Before this has happened, the first row of boxes has actuated switch LS9 to close contacts A-C thereof and these contacts form a holding circuit for the relay D to keep the accumulator conveyor motor energized even though a contact E1 which was hitherto closed should open. As the last row rides off the switches, the switches will move back to their original positions. LS5 will de-energize the stop solenoid SOL.1 and the spring loaded stop plate 280 will come up, against the under side of the boxes, and the boxes will ride over it, due to the rounded configuration of the upper end portion of the plate. After the first row has actuated LS9, it continues on to actuate the switch LS10 to close contacts A-C thereof. Relay E is energized, opening contact E1 in circuit 8 to break the flow of current to the switches LS5-LS8. This is to insure de-energization of the relay D and the stopping of the accumulator conveyor as the last row releases switch LS9 at the end of the accumulating conveyor. When the switch LS10 is released, relay E is de-energized, closing contact E1, in circuit 8, thereby preparing the circuit for re-energizing the relay D. The completed layer has then moved onto the transfer carriage TC on which it continues forwardly until it abuts the stop plate 205.

Figure 15:
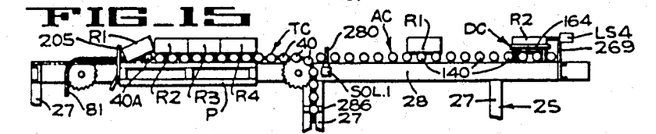
Figure 16:
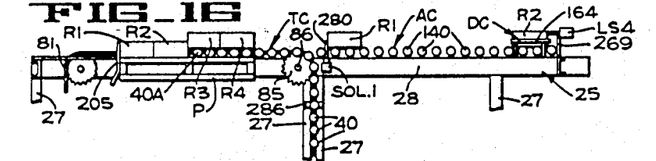
Figure 17:
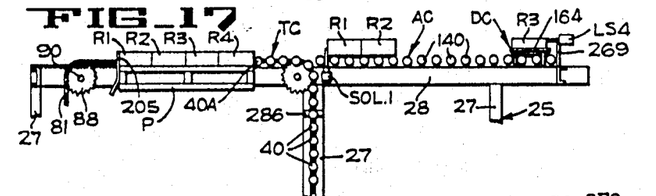
Figure 18:
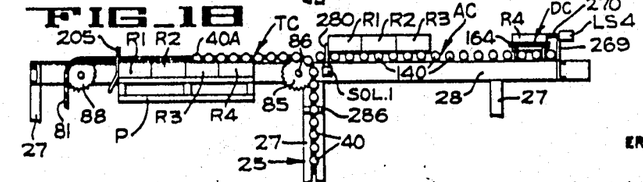

As explained above, when the leading row of articles engages the stop plate 205, the counterclockwise rotating rollers walk out from beneath the layer and the layer will drop onto the empty pallet (FIGS. 15-17). When the entire layer has been dropped on the pallet, the bar 91 on the lower end of the transfer carriage engages adjustable switch LS11 and closes contact LS11-1 in circuit 10. When switch LS11 closes, the elevator motor coils M1-LOWER are energized and the elevator starts to move downwardly. Since the spring units 95 at all times urge the transfer carriage forwardly, the rotating roller 40A rides along the end surface of the articles (FIG. 17) as the elevator moves downwardly and, as soon as the articles are below the level of the rollers, the rollers start forwardly toward the forward end of the machine (FIG. 18). As the carriage moves forwardly, switch LS11 opens and the elevator lowering motor coils are de-energized and the downward movement of the elevator stops. During downward movement of the elevator, the arm 213 on the table moves out of contact with switch LS1 and contact LS1-1 in circuit 5 closes and contact LS1-2 in circuit 3 opens. Then another cycle of collecting another layer and depositing it on the first layer on the pallet will begin. This action will continue until a predetermined number of layers are on the pallet. At that time, the cam bar 49 on the elevator will actuate the adjustable switch LS12 and closes contact LS12-1 in circuit 11, which bypasses contact LS11-1 and the elevator lower motor is held energized until the cam bar 49 on the elevator rides off the switch LS12 and allows LS12 to open. This should happen at the same time the elevator reaches its lowest position.

When the elevator reaches this down position, it engages switches LS2 and LS3. The engagement of LS2 closes contact LS2-1 in circuit 13 and contact LS2-2 in circuit 14. The closing of contact LS2-1 starts the pallet conveyor, moving the loaded pallet off the elevator and moving an empty pallet on. The closing of contact LS2-2 causes relay F to be energized opening contact F1 in circuit 3 to de-energize relay B1, to complete a palletizing operation. The next cycle will begin when the incoming empty pallet engages switch LS3. On the other hand, the engagement of switch LS3 by the loaded pallet results only in the counterclockwise depression of switch arm 247 and switch contacts LS3-1 therefore remain open. After the loaded pallet has been conveyed from the table T, the switch arm 247 springs back to its original position (FIGURE 2) ready for engagement by an incoming empty pallet.

It has been found that most machines constructed in accordance with this invention can be adjusted so that the carriage will return to its normal horizontal position considerably before a pallet layer has been accumulated. However, if such a machine is set up to load pallets with layers of only four cases in each, it may be desirable to employ a safety device which will prevent a layer from being discharged before the carriage has returned. On the other hand, if cases of valuable and fragile goods are being loaded it might be desirable to employ a similar safety device which will prevent a layer from being discharged if the carriage should fail to return. Both of these functions may be achieved by mounting a switch (like LS11) on posts 27 for actuation by carriage bar 91 only when the carriage has been fully returned. The switch would then be connected in series with the solenoid SOL.1. to prevent its energization unless the carriage is fully returned.

From the foregoing description it will be apparent that the present invention provides a novel efficient palletizing machine. The fact that the stripper carriage walks out from under the articles makes it possible to deposit the articles without reversing any mechanisms. Therefore no costly reversing mechanisms and controls are required.

Further, the layer-discharging operation is begun automatically as soon as the advancing articles engage the stop plate 205. Also, the rearward, article-lowering movement of the carriage stops as soon as the last row of the layer has been dropped, and the carriage starts forward immediately. This automatic cycling movement of the carriage eliminates the need for timing and reversing controls and makes possible a pallet-loading operation that is carried out considerably faster than has heretofore been possible.

The use of an accumulator conveyor to form and store a layer of articles, while the previous layer is being discharged and while an entire pallet load is being carried out of the machine, also increases the operating speed of the machine since articles can be continuously moved into the machine and stored on the accumulator. The use of a flexible stripper carriage, that moves to a vertical retracted position, makes it practicable to mount an accumulator conveyor alongside the palletizing zone whereas previous palletizers that make use of reciprocating stripper plates require so much operating space that the addition of an accumulator is not feasible.

It will be understood that modifications and variations may be effected without departing from the scope of the novel concepts of the present invention.

Having thus described the invention, what is claimed as new and desired to be protected by Letters Patent is:

1. An article handling machine comprising a support, a carriage movable along said support and having a plurality of rollers, an abutment on the support adjacent to the forward end of said carriage, means providing an article receiving member below the carriage, means for positioning an article on said rollers in contact with said abutment, and drive means for rotating the rollers in a direction such that an article positioned thereon is urged forwardly against the abutment, continued rotation of the rollers by said drive means being effective to cause the rollers to move rearwardly from under said article and to permit the article to be deposited on said article receiving member.

2. A machine for loading a layer of articles in orderly arrangement onto a pallet, said machine comprising a stationary support structure; a carriage mounted directly on said support, said carriage having an article supporting portion movable relative to the support and including a plurality of rotatable rollers disposed transverse to the direction of movement of said article supporting portion; an abutment on the support adjacent the forward end of the carriage; means providing support for a pallet below the carriage; means for positioning a layer of articles in orderly arrangement on said rollers and in contact with said abutment, and drive means for rotating said rollers in a direction such that said layer of articles is urged against said abutment, continued rotation of the rollers by said drive means being effective to cause said rollers to move rearwardly relative to said stationary support from under the layer of articles and to permit said layer of articles to be deposited on said pallet while preserving the orderly arrangement thereof.

3. An article handling machine comprising a support; a carriage movable along said support between a first and a second position and having a plurality of rotatable rollers; an abutment arranged on the support so as to lie adjacent one end of said carriage when the carriage is in said first position, said carriage having a portion at the other end thereof hanging downwardly from said support and exerting a pull on the remainder of the carriage, due to the weight of said portion, which tends to move the carriage to said second position; bias means operatively connected to the carriage and arranged to exert a force on the carriage tending to move it to the first position, said force being greater than said pull; means for positioning an article on the carriage against said abutment when the carriage is in the first position; and means for rotating said rollers in a direction such that an article thereon is urged towards said abutment by the rollers and continued rotation of said rollers, while said article is in engagement with said abutment, being effective to assist said pull and overcome said force to move the carriage away from said abutment and from under the article.

4. An article handling machine comprising: a support; a carriage movable along said support between a forward and a rearward position and having a plurality of rotatable rollers; an abutment on said support adjacent the forward end of said carriage when said carriage is in said forward position, said carriage having a portion at the rearward end thereof freely suspended from said support and exerting a pull on said carriage due to the weight of said suspended portion tending to move said carriage to said rearward position; a spring system operatively connected to the forward end of said carriage and arranged to exert a force on said carriage tending to move said carriage to said forward position, the force of said spring system being slightly greater than the gravity pull of said suspended carriage portion; means for positioning an article on said carriage against said abutment; and means for rotating said rollers in a direction such that an article on said rollers is urged toward said abutment by said rollers, continued rotation of said rollers while said carriage is in engagement with said abutment and in engagement with said rollers being effective to cause said rollers to move rearwardly from under the article.

5. An article handling machine comprising a support structure; a carriage movable between a forward and a rearward position in said structure and including a plurality of rollers defining an article support surface; spring means operatively connected to said carriage and arranged to exert a continuous force on said carriage in a direction to move said carriage to said forward position; vertically movable elevator means for positioning a pallet in said structure immediately below said carriage when the carriage is in the forward position; means for disposing a group of articles in stationary position on said roller support surface; means for rotating said rollers in a direction urging said stationary articles forwardly of said rollers whereby said rollers frictionally engage the undersurface of the articles and move rearwardly from under said articles permitting them to drop on the pallet; and means responsive to the rearward movement of said carriage for lowering said pallet, said spring means being effective to stop the rearward movement of said carriage when the last article of said group has been dropped and effective to return said carriage to the forward position as soon as the pallet has been lowered.

6. A machine for loading articles onto a pallet comprising a fixed support structure; a carriage movable between a first substantially horizontal position and a second substantially vertical position in said structure, said carriage including a plurality of rollers arranged transversely to the direction of carriage movement and defining an article support surface; bias means operatively connected to said carriage and arranged to exert continuous force on the carriage in a direction to move said carriage to said first position; vertically movable elevator means for positioning a pallet in said structure immediately below the carriage when the carriage is in said first position; means for disposing an orderly array of articles in substantially stationary position on said article support surface when the carriage is in said first position; means defining a stop on said support structure; means for rotating said rollers and for moving the carriage from the first to the second position from underneath the articles while urging said article array against said stop so that said article array is maintained substantially stationary in the horizontal plane but is permitted to drop vertically onto said pallet while preserving said orderly array; and means for lowering said pallet and article array after it has been deposited thereon, said bias means being effective to yield as said carriage moves to said second position and to stop the movement of the carriage from the first to the second position when the last article of said array has been dropped and being effective to return the carriage to the first position as soon as the pallet and the array have been lowered.

7. A machine for loading articles onto a pallet comprising a stationary support structure; a carriage movable between a first substantially horizontal position and a second substantially vertical position in said structure, said carriage including a plurality of rollers defining an article support surface; bias means operatively connected to said carriage and arranged to exert a continuous force on said carriage in a first direction to move said carriage to the first position; vertically movable elevator means for positioning a pallet in said structure immediately below said carriage when the carriage is in said first position; means for disposing an orderly array of articles in substantially stationary position on said article support surface; means providing an abutment on said support structure adjacent the end of said carriage when said carriage is in said first position; means for rotating said rollers in a direction urging said article array against said abutment whereby said rollers frictionally engage the undersurface of the articles and thereby cause the carriage to move in a direction opposite said first direction and against said continuous force from underneath the articles permitting them to drop on the pallet while preserving said orderly array; and means for lowering said pallet and article array, said bias means being effective to stop the movement of the carriage from the first to the second position when the last articles of said array have been dropped on said pallet and being effective to return the carriage to the first position as soon as the pallet has been lowered.

8. An article handling machine comprising a support structure; a carriage movable forwardly and rearwardly in said structure and having a plurality of rotatable rollers providing an article support surface; means for positioning a pallet in stationary position within said structure; an article feed means arranged to move articles onto said rollers; drive means operatively connected to said carriage for continuously urging said carriage forwardly in said structure to position said carriage above said pallet; an abutment mounted in said structure adjacent said rollers and arranged to stop the articles in a position above the pallet; means for rotating said rollers in a direction to urge the articles forwardly and hold them against said abutment, whereby the rollers will frictionally grip the undersurface of the articles and move rearwardly from under the articles permitting them to drop on the pallet, the rearward movement of said rollers automatically terminating when the last article of said group has been dropped.

9. An article handling machine comprising an elongated elevated stationary support structure, a pair of flexible chains supported in spaced relation for movement relative to said structure and in a direction longitudinally of said structure, a plurality of rollers secured to and extending between said chains, a pair of endless belts mounted in said structure and having upper runs in frictional engagement with the lower surfaces of said rollers, an abutment, means for positioning an article on said rollers and in contact with said abutment, and means for driving said belts to rotate said rollers in a direction to press the article forwardly against said abutment, whereby the frictional engagement of said rollers with the article causes said rotating rollers and said chains to move as a unit rearwardly along said stationary support structure away from said abutment and out from beneath said article to drop said article.

10. An article handling mechanism comprising a support structure, a carriage mounted for longitudinal reciprocating movement in said structure and including a plurality of rollers extending transversely of said structure, means for supporting an article receiving member below said structure, means for positioning said carriage above said article receiving member, means for positioning a plurality of articles on said rollers to impose a load thereon, drive means in frictional engagement with certain of said rollers to rotate said rollers, a sprocket keyed to at least one of said rollers, a second drive means comprising a chain movable longitudinally of said structure and disposed in contact with said sprocket to rotate said sprocket and the attached roller during movement of said chain, the frictional engagement of said rollers and said articles being effective during rotation of said rollers to cause said rollers to roll along the stationary undersurface of the articles to pass from below the articles causing the articles to be dropped on said article receiving member.

11. A machine for loading articles onto a pallet comprising a support structure; a carriage mounted for longitudinal movement to and from a horizontal position within said structure; said carriage including a plurality of transversely extending rollers defining an article support surface; pallet support means for supporting a pallet in said structure immediately below said article support surface when the carriage is in said horizontal position; means for positioning a complete layer of articles in an orderly array on the article support surface to impose a load on said rollers when the carriage is in the horizontal position; drive means in frictional engagement with certain of said rollers to rotate said rollers; a sprocket keyed to at least one of said rollers; and a second drive means comprising a chain movable longitudinally of said structure and disposed in contact with said sprocket to rotate said sprocket and the attached roller during movement of said chain, the frictional engagement of said rollers and said articles being effective during rotation of said rollers to cause said rollers to roll along the stationary undersurface of the articles and thereby to cause said carriage to move from the horizontal position below the layer of articles to drop said layer onto the pallet while maintaining said orderly array.

12. An article handling machine comprising an elevated support structure, a forward and a rearward shaft mounted for rotation in spaced relation in said support structure, a pair of sprockets mounted on each shaft, each sprocket on said first shaft being in alignment with a sprocket on said second shaft, a flexible chain trained around each pair of aligned sprockets, each chain having a forward end portion depending from the sprocket on said forward shaft and a rearward portion depending from the sprocket on said rearward shaft, a plurality of rollers carried by and extending between said chains, and tensioning means operatively connected to the forward end portions of said chains and adapted to exert a pulling force on said chains tending to pull said rollers forwardly in said structure, the pull exerted by said tensioning means being slightly greater than the gravity pull exerted in the opposite direction by the rearward portions of said chains.

13. A machine for loading a layer of articles onto a pallet, said layer consisting of a plurality of article rows, said machine comprising, in combination an article accumulating conveyor having an article reciving end and an article discharge end; means for delivering successive rows of articles to the receiving end of the accumulating conveyor so that each row lies transversely of the accumulating conveyor; retractable stop means disposed at the discharge end of the accumulating conveyor so that the first row of articles of one pallet layer is brought to rest against said stop means and so that each succeeding row of that layer is brought to rest behind said first row; a layer discharge control means adapted to retract said stop when a layer is completely formed so that the complete layer is discharged from the accumulating conveyor; a flexible stripper carriage normally arranged substantially horizontally at the discharge end of the accumulating conveyor and adapted to receive a complete layer of articles discharged from the accumulating conveyor; an elevator for supporting a pallet immediately below the stripper carriage when said stripper carriage is in its normal position; abutment means arranged above the stripper carriage so that, if one edge of a completed pallet layer is in contact with said abutment means, said pallet layer is vertically aligned with the pallet; means for moving the stripper carriage from the normal position to a vertical position adjacent said elevator so as to bring one edge of the completed pallet layer against said abutment means and so as to move from beneath said completed pallet layer to deposit said layer onto the pallet; and elevator control means for lowering the pallet after a layer has been deposited thereon to allow the stripper carriage to return to its normal horizontal position.

References Cited by the Examiner
UNITED STATES PATENTS

| | | |
|---|---|---|
| 2,065,674 | 12/1936 | Fay. |
| 2,272,677 | 2/1942 | Meneray et al. ______ 198—183 |
| 2,815,870 | 12/1957 | Laub. |
| 2,850,145 | 9/1958 | Heacock ____________ 198—57 |
| 2,875,908 | 3/1959 | Woodcock. |
| 2,883,074 | 4/1959 | Boehl et al. |
| 3,070,241 | 12/1962 | Johnston. |

GERALD M. FORLENZA, *Primary Examiner.*

MORRIS TEMIN, HUGO O. SCHULZ, *Examiners.*